United States Patent [19]

Nagel

[11] 4,346,836
[45] Aug. 31, 1982

[54] PRESSURE COOKER CANNING UNIT

[76] Inventor: Louis F. Nagel, P.O. Box 1767, Oakland, Calif. 94604

[21] Appl. No.: 178

[22] Filed: Jan. 2, 1979

Related U.S. Application Data

[63] Continuation of Ser. No. 814,729, Jul. 11, 1977, abandoned.

[51] Int. Cl.³ ............................................. F22B 35/00
[52] U.S. Cl. .................................. 236/26 A; 126/374; 126/389; 137/505.18
[58] Field of Search .......................... 236/26 A, 46 R; 126/389, 374, 373; 219/43; 137/505.18

[56] References Cited

U.S. PATENT DOCUMENTS

| | | | |
|---|---|---|---|
| 757,881 | 4/1904 | Burke | 137/505.18 |
| 771,013 | 9/1904 | Herdrich | 236/26 A |
| 966,611 | 8/1910 | Shuster | 236/26 A |
| 1,083,899 | 1/1914 | Ronk | 236/26 A |
| 1,752,087 | 3/1930 | Hixon | 236/26 A |
| 1,756,787 | 4/1930 | Coughnour | 126/389 |
| 2,402,287 | 2/1949 | Richeson et al. | 126/389 X |
| 3,012,730 | 12/1961 | Coogan | 236/46 R |
| 3,318,402 | 5/1967 | Hendrick | 73/1 R |

FOREIGN PATENT DOCUMENTS

| | | | |
|---|---|---|---|
| 78228 | 11/1894 | Fed. Rep. of Germany | 236/26 A |
| 1504 | of 1903 | United Kingdom | 236/26 A |

Primary Examiner—Albert J. Makay
Assistant Examiner—Henry Bennett
Attorney, Agent, or Firm—Bielen and Peterson

[57] ABSTRACT

A pressure cooker canning unit for batch canning, the canning unit including a pressurizable retort having a highly accurate control and monitoring system for temperature regulation and recordation, the retort having a pressure gauge and a thermometer tree for visual monitoring of the pressure and temperature in the retort, a temperature probe and connected temperature recording device for continuous recording of the temperature within the retort and a pressure relief valve for safely releasing excess pressure in the retort, the retort being heated by a gas burner with a gas flow regulated by a unique flow control valve modulated by the pressure within the retort for maintaining a constant temperature within the retort.

11 Claims, 4 Drawing Figures

U.S. Patent   Aug. 31, 1982   Sheet 1 of 2   4,346,836
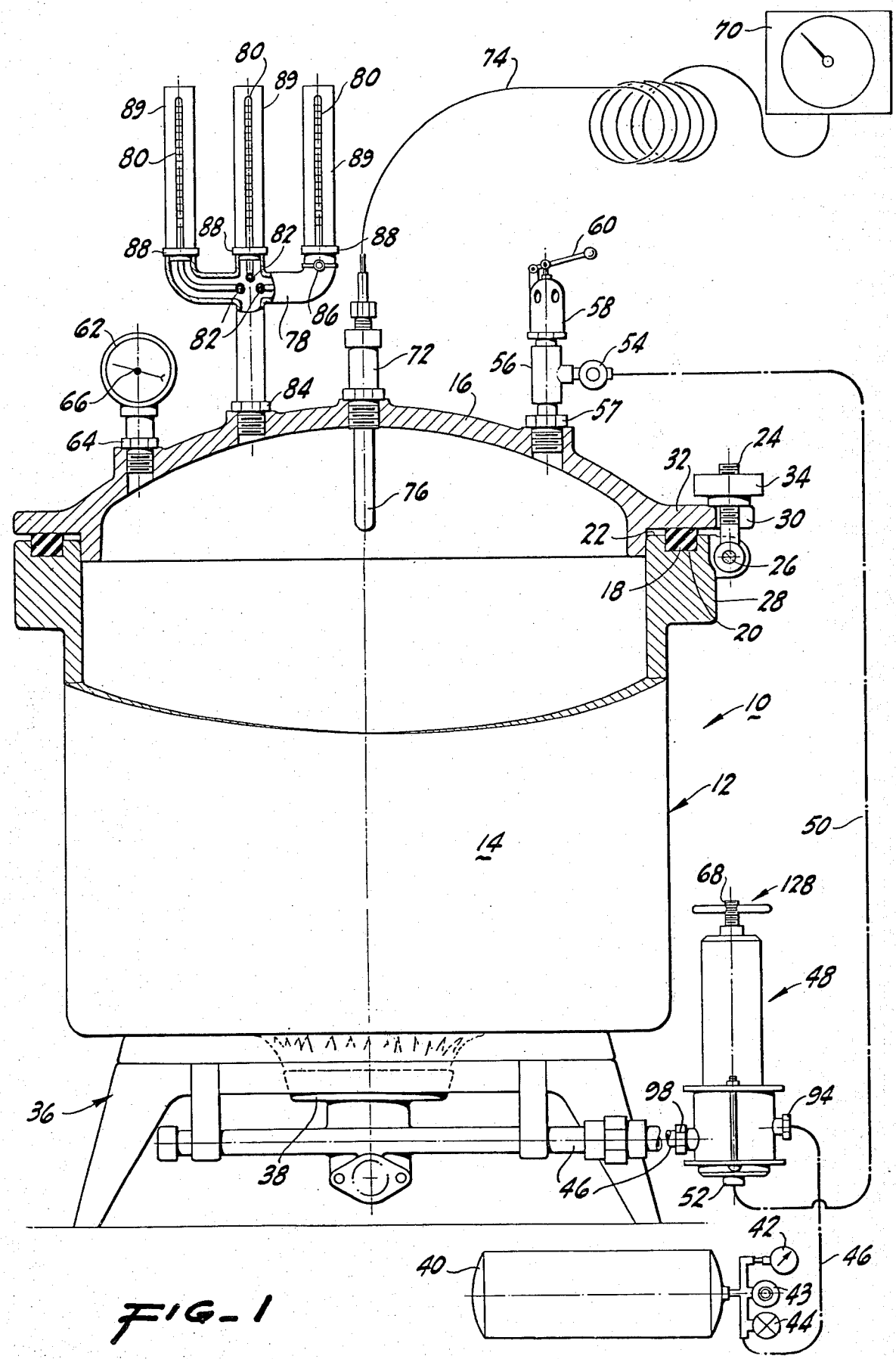
FIG_1

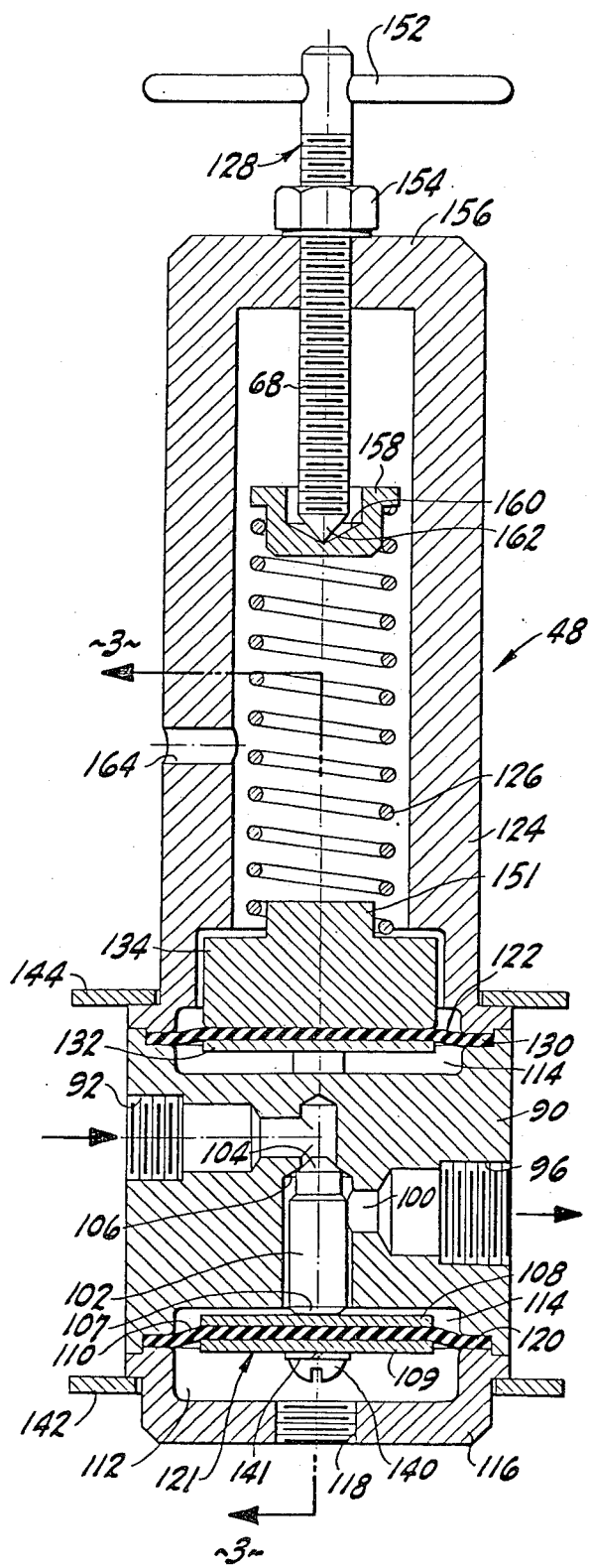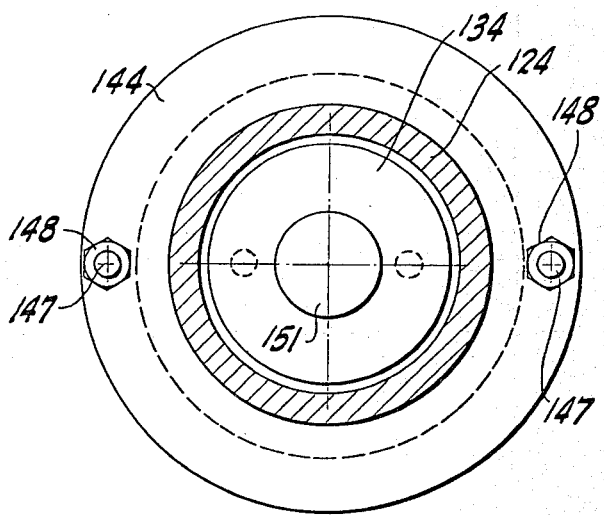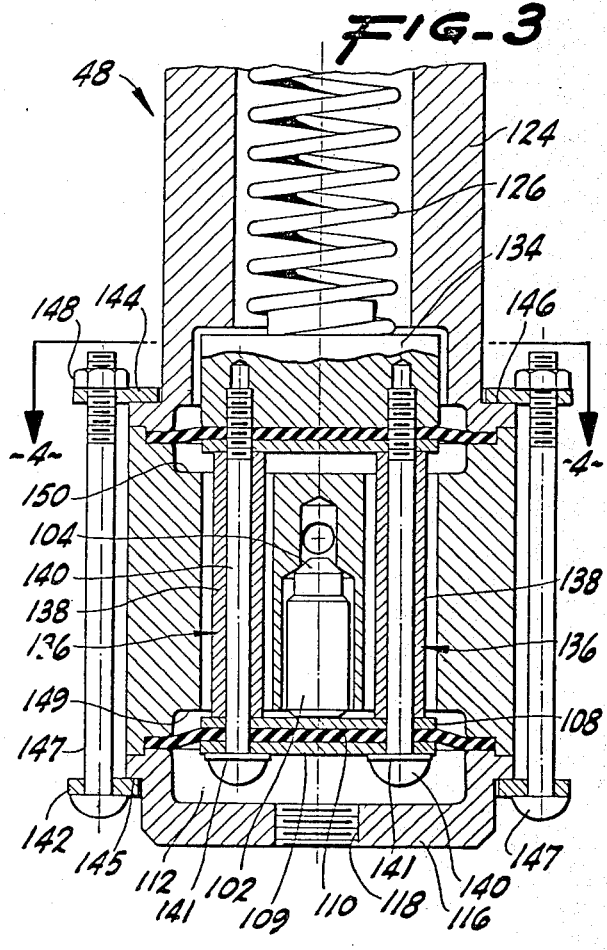

PRESSURE COOKER CANNING UNIT

This is a continuation of application Ser. No. 814,729, filed July 11, 1977, now abandoned.

BACKGROUND OF THE INVENTION

This invention relates to food preservation apparatus for canning, and in particular to a closely controlled and monitored temperature and pressure cooking unit suitable for home canning or for canning on an intermediate scale where portability of the equipment is advantageous. Because of the very serious consequences in improperly processed food, reliability in both the process and the apparatus is necessary for confident consumption of the food preserved. Key to this cooking unit is a unique low pressure regulator for controlling the gas flow to a heating burner which is operated in conjunction with a pressure cooker or retort. The pressure regulator comprises a sensitive flow control valve monitored by the steam pressure within the retort in a closed loop operation that accurately maintains a preselected temperature within the retort. The temperature within the retort is continuously recorded by a thermal recording device and accurately verified by a triple or single element thermometer tree in order that the canning process can be fully monitored.

Historically, canning was a long sought answer to the problem of food preservation, which became particularly acute during times of war in providing armies with the necessary food supplies. Nicolas Appert, a Frenchman is credited with discovering the method of food preservation by heating prepared food and hermetically sealing the food in sterilized containers. By trial and error he established various temperatures and durations for different foods. In the subsequently developed canning with tin cans, as opposed to glass jars, the cans are usually filled and sealed before the sealed cans are heated to the prescribed temperatures for the required duration.

Since spoilage of food is caused by enzyme activity or the growth of microorganisms such as bacteria, molds or yeast, destruction of such by application of heat will prevent spoilage if the food is subsequently isolated from reinfestation by sealing the food in containers. Because the temperature and duration of heating affects the composition and consistency of the food, as well as the nutritional value of the food, it is desirable that the minimum temperature and duration be applied to prevent overcooking of the food. For nonacid foods, in order to assure destruction of the spores of clostridium botulinum, which can generate a deadly poison, the food must be heated at the boiling point for more than five hours. However, by raising the temperature above the boiling point to 240° or 250° F., the duration of heating can be substantially reduced. A pressure cooker is thereby necessary to allow for use of higher than boiling point temperatures to optimize the temperature and duration of cooking to insure proper preservation and maximum quality of the food preserved.

The canning unit devised is designed to insure both the quality of the food and sufficiently of the preserving process on less than a large commercial scale canning endeavor.

SUMMARY OF THE INVENTION

The pressure cooker canning unit of this invention utilizes a combination of control and monitor systems to absolutely insure that a proper preserving process has occured, in order to eliminate the very real dangers heretofore encountered in the usual smaller scale canning processes such as in home canning. Because the canning unit of this invention in the preferred embodiment is essentially a composite unit with its own heat source, the unit is ideal for use in the field or in remote locations where a large scale fixed canning facility is not feasible.

Key to the effective operation of the canning unit is a gas regulator that is regulated by the steam pressure within the pressure vessel or retort of the unit. The steam pressure is directly proportional to the temperature within the retort thus effectively making the gas regulator temperature respondent.

The pressure cooker canning unit has a control and monitoring system devised to accurately regulate, monitor and record the cooking process. The unit includes a pressure cooker or retort arranged in conjunction with a portable gas burner. The gas burner is supplied by a conventional gas cylinder such as a propane tank. The flow of gas from the tank to the burner, as noted briefly above, is regulated by steam through a steam line connecting the retort and gas regulator such that the steam pressure continuously regulates the gas and hence the intensity of the burner flame.

The retort includes a pressure release valve or safety valve to insure that a maximum safe pressure is never inadvertently exceeded. Other instruments mounted on the retort allow for continuous visual monitoring of the cooking operation and provide an accurate calibration standard and check for the automatic gas regulator and recorder device. The recorder device maintains a record of the temperature within the retort throughout the cooking operation, such that by inspecting the record, the operator can be assured that the proper cooking temperature has been maintained for the proper duration for the particular food being preserved.

BRIEF DESCRIPTION OF THE DRAWINGS

FIG. 1 is a front elevational view partially in section of the pressure cooker canning unit.

FIG. 2 is an enlarged cross-sectional view of the gas regulator of the canning unit of FIG. 1.

FIG. 3 is a cross-sectional view of a portion of the gas regulator, taken on the lines 3—3 in FIG. 2.

FIG. 4 is a cross-sectional view of the gas regulator taken on the lines 4—4 in FIG. 3.

DETAILED DESCRIPTION OF THE PREFERRED EMBODIMENT

Referring to FIG. 1, the pressure cooker canning unit designated generally by the reference numeral 10 is shown in the preferred arrangement which allows the unit to be portable with a self-contained fuel supply. The central element in the unit is a pressurizable retort 12 which is constructed to withstand the moderate pressures required in the food preserving processes. These pressures generally do not exceed twenty-five pounds per square inch, which provide a cooking temperature range from 212° through 260°, the maximum temperature necessary for virtually all canning operations. Because the retort is designed for home use, it is constructed with a substantial safety factor to permit a safe use in a home environment. The retort 12 comprises a large container vessel 14 suitable for containing a substantial number of cans or jars for canning operations and a cover 16, which is mounted to the vessel 14 on a ring seal 18. The seal is carried in a groove 20 in the top lip 22 of the container vessel 14. The cover 16 is secured to the vessel 14 by a series of hinged bolts 24 mounted (one shown) on horizontal pivot pins 26 around the peripheral edge 28 of the vessel. Each hinged bolt 24 engages a slot 30 in the outer rim 32 of the cover 16. The cover is secured to the vessel by a knurled tightening nut 34 which is threaded on the bolt 24 and seated on the outer rim 32 of the cover 16. When the tightening nuts 34 are uniformly tightened around the retort, an effective seal is formed for pressurized cooking.

The retort 12 is supported on a gas stove 36 of conventional design having at least one burner 38 directed at the bottom of the retort 12. The burner is connected to a gas storage cylinder 40 which stores a supply of propane or other suitable combustible gas. The storage cylinder 40 (shown schematically in FIG. 1) includes a conventional pressure gauge 42, pressure regulator 43 and shut off valve 44.

Located on the gas supply line 46 between the storage cylinder 40 and burner 38, is a novel regulator 48, which regulates the supply of combustible gas to the burner according to the pressure in the retort. Since the temperature is directly proportional to the pressure for saturated steam, the regulator 48 is essentially responsive to the controlled variable, temperature, which is a primary criteria in a food preservation operation by canning. The controlled medium, saturated steam, provides the control agent, pressure, for varying the gas flow through the regulator and at the other end to a valve 54. The valve 54 is a simple gate valve utilized to provide an on-off connection of the retort to the regulator, and is connected to a T-fitting 56 having a safety relief valve 58. The safety relief valve communicates directly with the retort through the T-fitting, 56 and a cover fitting 57, and comprises a conventional spring biased valve preset for automatic release of pressure well within the maximum design pressure of the retort. The safety relief valve 58 has a release lever 60 for manual release of pressure when desired, for example, before opening the vessel.

The pressure within the retort 12 is visually monitored by a pressure gauge 62 mounted on the cover by cover fitting 64. The pressure gauge 62 comprises a conventional gauge with a dial indicator 66 which can be utilized to manually adjust the gas regulator 48 by adjustment screw 68 to a setting representative of the desired temperature.

The temperature within the retort is continuously recorded on a recorder instrument 70 which is connected to a temperature probe 72 through thermal gauge wire 74. The probe 72 has a sensor 76 which projects into the center of the retort down to a level that is a cold spot in the retort such that the minimum cooking temperature is continuously monitored and recorded.

A thermometer tree 78 is mounted on the retort cover 16 and includes three mercury filled thermometers 80 having their bulb ends 82 positioned in juxtaposition for a localized measuring of the steam temperature. In this manner, an accurate average or median temperature can be obtained for visual periodic monitoring of the cooking process as well as for calibrating the other instruments and component devices.

The thermometer tree 78, mounted to the cover on a fitting 84, is hollow with one or more stop cock valves 86 to bleed the tree of air during the cooking operation in order that a true saturated steam temperature is obtained. As an alternative to two stop cock valves 86 at the extremities of the thermometer tree 78 a single bleed valve can be located at the position of the thermometer bulb ends. The mercury thermometers are supported and sealed in position by bushings 88, and include a calibrated back plate 89 for easy reading and for protection from damage.

The novel regulator 48 is shown in greater detail in FIGS. 2-4. The regulator 48 as described hereinbefore comprises a sensitive closed loop control on the combustible gas flow from the storage cylinder to the burner. While employed herein for a gas regulation, the regulator devised is suitable for a variety of fluids, either gas or liquid. A core housing 90 includes a gas inlet 92 threaded to receive gas line connector fitting 94, shown in FIG. 1 and a gas outlet 96 threaded to receive gas line connector fitting 98, also shown in FIG. 1. The internal passage 100 through the core housing 90 from the inlet 92 to the outlet 96 is restricted by a poppet 102 having a nose end 104 which seats on a constricted opening 106. The position of the poppet 102 determines the effective opening size and hence the gas flow through the regulator.

The base end 107 of the poppet 102 is seated on an inner plate of two rigid diaphragm plates 108 and 109, between which is sandwiched a flexible diaphragm 110. The flexible diaphragm 110 separates a steam pressure chamber 112 from the outlet portion of the gas passage 100 which includes certain dead space 114 to allow for free movement of the poppet 102 and diaphragm 110. The steam passage chamber is defined by an end cap 116 having a threaded steam inlet 118 for coupling the fitting 52 of the pressure line shown in FIG. 2. The end cap 116 mounts to the core housing 90 over the peripheral edge 120 of the diaphragm such that the edge of the diaphragm is compressed to form a gasket-like seal while supporting the diaphragm.

The diaphragm 110 is part of a moveable diaphragm assembly 121 which includes a second diaphragm 122 at the interconnection of the core housing 90 with a spring barrel 124. The spring barrel 124 houses an elongated compression spring 126 and adjustment screw 68. As in the interconnection of the end cap and core housing, the spring barrel 124 mounts to the core housing 90 over the peripheral edge 130 of the second diaphragm 122, compressing the diaphragm edge and generating an effective seal for the core housing. The core housing 90 and gas passage 100 are effectively isolated hermatically from the steam chamber 112 and spring barrel 124. The dead space 114 in communicating with the faces of both diaphragms allows an equalization of pressure in the core housing such that the control sensitivity is not affected by combustion gas pressures.

The second diaphragm 122 includes a rigid diaphragm plate 132 on the inner or core housing side of the diaphragm and a spring follower 134 on the outer or spring barrel side of the diaphragm. The two diaphragms of the diaphragm assembly are connected in tandem by a pair of connectors 136 comprising a pair of sleeve spacers 138 seated against the opposed diaphragm plates 108 and 132 of the diaphragm assembly, and, a pair of threaded machine screws 140 with washers 141, the screws having ends threaded into the spring follower 134. The core housing is essentially sandwiched between the spring barrel and end cap by clamping rings 142 and 144 seated on shoulders 145 and 146 of the end cap 116 and spring barrel 124 respectively. The clamping rings 142 and 144 are connected and compressed by bolts 147 and nuts 148. The housing includes recesses 149 and 150 to accommodate the diaphragm and associated attached components during limited displacements of the diaphragm assembly.

The spring follower 134 engages the elongated compression spring 126 which seats on the face of the follower around a projecting boss 151 which centers the spring on the follower. The spring 126 is longitudinally and concentrically oriented in the spring barrel 124. A definable bias is generated in the spring by action on the handle 152 of the turn screw 68 which is threaded through a nut 154 attached to the top end 156 of the barrel housing, and engages a bearing plug or button 158 mounted in the end of the compression spring. The bearing button 158 has a countersunk conical hollow 160 which is engaged by the more sharply conical end 162 of the turn screw 68 for centering the screw at the effective center of the compression spring 126.

Movement of the poppet is a result of a displacement of the diaphragm caused by action of the steam pressure against the diaphragm so resisted by the bias of the compression spring. By turning the turn screw, the effective bias of the spring is adjusted and hence the pressure in the steam chamber 122 required to displace the diaphragm assembly 121 and the poppet 102 is adjusted for the desired gas flow to the burner. Variations in the steam pressure and hence the temperature in the cooker open or close the poppet in a continuous feedback cycle throughout the cooking operation. The spring barrel is vented by a hole 164 to relieve any pressure differentials within the barrel which might otherwise develop from displacements of the diaphragm assembly.

The compression spring is stainless steel and is approximately four inches long, free length, and in the preferred embodiment is rated at 26.2 lb/in. Using such a spring a pressure senitivity of 0.1% is achievable in the retort 12.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

I claim:

1. A pressure cooking canning unit for canning with saturated steam pressure comprising in combustion:
   a. a pressurizable retort;
   b. a gas burner means arranged with said retort for providing a heating flame to said retort and generating a steam pressure within said retort, said gas burner means having a combustible gas supply for providing combustible gas from said gas supply to said burner means; and
   c. control means for automatically modulating the flow of gas from said gas supply to said burner means in direct accord with the steam pressure within said retort, said control means comprising a diaphragm actuated regulator between said gas supply and said burner, said regulator having:
   1. a core housing with first and second ends with a first diaphragm element sealing said first end of said housing, a second diaphragm element sealing said second end of said housing, connecting means for rigidly connecting said first and second diaphragm elements into a diaphragm assembly wherein said first and second diaphragm elements are displaceable in unison, a gas flow passage through said core housing between said first and second diaphragm elements wherein said gas passage has a gas chamber space in communication with said first and second diaphragm elements for equalization of gas pressures on said diaphragm elements, said gas flow passage having further an inlet in communication with said gas supply, said inlet having a constricted opening in said housing to said chamber space and an outlet from said chamber space in communication with said burner means, and, a single poppet having a base end seated on said first diaphragm element and a nose end positionable in said constricted opening in position to the direction of gas flow and displaceable therein on displacements of said diaphragm assembly whereby the effective size of the opening is varied according to said diaphragm assembly displacements;
   2. an end housing coupled to said first end of said core housing constructed to form a steam pressure chamber in conjunction with said first diaphragm element opposite said gas chamber space, said end housing having a steam inlet in communication with said retort; and,
   3. a spring housing coupled to said second end of said core housing with an internal spring element operably engaging said second diaphragm element opposite said gas chamber space, said spring housing having further spring compression adjusting means for adjusting the effective compression bias of said spring element as applied against said second diaphragm element.

2. A pressure cooking canning unit for canning with saturated steam pressure comprising in combination:
   a. a pressurizable retort;
   b. a gas burner means arranged with said retort for providing a heating flame to said retort and generating a steam pressure within said retort, said gas burner means having a combustible gas supply for providing combustible gas from said gas supply to said burner means; and
   c. control means for automatically modulating the flow of gas from said gas supply to said burner means in direct accord with the steam pressure within said retort, said control means comprising a diaphragm actuated regulator between said gas supply and said burner, said regulator having:
   1. a core housing with first and second ends with a first diaphragm element sealing said first end of said housing, a second diaphragm element sealing said second end of said housing, connecting means for rigidly connecting said first and second diaphragm elements into a diaphragm assembly wherein said first and second diaphragm elements are displaceable in unison, a gas flow passage through said core housing between said first and second diaphragm elements wherein said gas passage has a gas chamber space in communication with said first and second diaphragm elements for equalization of gas pressures on said diaphragm elements, said gas flow passage having further an inlet in communication with said gas supply, said inlet having a constricted opening in said housing to said chamber space and an outlet from said chamber space in communication with said burner means, and, a single poppet having a base end seated on said first diaphragm element and a nose end positionable in said constricted opening in opposition to the direction of gas flow and displaceable therein on displacements of said diaphragm assembly, wherein said regulator is vertically oriented with said second diaphragm element horizontally positioned over said horizontally positioned first diaphragm element and wherein said poppet is freely seated on said first diaphragm element and situated by said constricted opening, whereby the effective size of the opening is varied according to said diaphragm assembly displacements;

2. an end housing coupled to said first end of said core housing constructed to form a steam pressure chamber in conjunction with said first diaphragm element opposite said gas chamber space, said end housing having a steam inlet in communication with said retort; and, 3. a spring housing coupled to said second end of said core housing with an internal spring element operably engaging said second diaphragm element opposite said gas chamber space, said spring housing having further spring compression adjusting means for adjusting the effective compression bias of said spring element as applied against said second diaphragm element.

3. A pressure regulator for regulating a saturated steam pressure in a steam supply generated by a gas fired steam generating device wherein the flow of a combustible gas supply for the steam generating device is modulated by the pressure of the steam supply, the regulator comprising:

a. a core housing with first and second ends with a first diaphragm element sealing said first end of said housing, a second diaphragm element sealing said second end of said housing, connecting means for rigidly connecting said first and second diaphragm elements into a diaphragm assembly wherein said first and second diaphragm elements are displaceable in unison, a gas flow passage through said core housing between said first and second diaphragm elements wherein said gas passage has a gas chamber space in communication with said first and second diaphragm elements for equalization of gas pressures on said diaphragm elements, said gas flow passage having further an inlet in communication with said gas supply, said inlet having a constricted opening in said housing to said chamber space and an outlet from said chamber space in communication with said steam generating device, and, a single poppet having a base end seated on said first diaphragm element and a nose end positionable in said constricted opening in opposition to the direction of gas flow and displaceable therein on displacements of said diaphragm assembly, wherein said regulator is vertically oriented with said second diaphragm element horizontally positioned over said horizontally positioned first diaphragm element and wherein said poppet is freely seated on said first diaphragm element and situated by said constricted opening, whereby the effective size of the opening is varied according to said diaphragm assembly displacements;

b. an end housing coupled to said first end of said core housing constructed to form a steam pressure chamber in conjunction with said first diaphragm element opposite said gas chamber space, said end housing having a steam inlet in communication with said steam supply; and, c. a spring housing coupled to said second end of said core housing with an internal spring element operably engaging said second diaphragm element opposite said gas chamber space, said spring housing having further spring compression adjusting means for adjusting the effective compression bias of said spring element as applied against said second diaphragm element.

4. The pressure cooking canning unit of claim 1 wherein said regulator is vertically oriented with said second diaphragm element horizontally positioned over said horizontally positioned first diaphragm element and wherein said poppet is freely seated on said first diaphragm element and situated by said constructed opening.

5. The pressure cooking canning unit of claim 4 comprising further means for determining the temperature within said retort.

6. The canning unit of claim 5 wherein said means for determining the temperature within the retort comprises a pressure measuring means with a visual readout.

7. The canning unit of claim 6 wherein said pressure measuring means comprises a pressure gauge attached to and penetrating said retort.

8. The canning unit of claim 5 wherein said means for determining the temperature within said retort comprises at least one thermometer attached to and penetrating said retort.

9. The canning unit of claim 5 wherein said means for determining the temperature within said retort comprises a recording means having a temperature probe attached to and penetrating said retort for continuously recording the temperature in said retort.

10. The canning unit of claim 5 comprising further means for automatically releasing pressure from said retort when steam pressure within said retort reaches a predetermined level.

11. The canning unit of claim 8 comprising further a pressure measuring means for measuring and displaying the pressure within said retort, a recording means for continuously recording the temperature in said retort and means for automatically releasing pressure from said retort when steam pressure within said retort reaches a predetermined level.

* * * * *